United States Patent [19]

Fu et al.

[11] Patent Number: 5,754,697
[45] Date of Patent: May 19, 1998

[54] SELECTIVE DOCUMENT IMAGE DATA COMPRESSION TECHNIQUE

[76] Inventors: Chi-Yung Fu, 29 Cameo Way, San Francisco, Calif. 94131; Loren I. Petrich, 1674 Cordoba St., #4, Livermore, Calif. 94550

[21] Appl. No.: 441,152

[22] Filed: May 15, 1995

Related U.S. Application Data

[63] Continuation-in-part of Ser. No. 348,431, Dec. 2, 1994, Pat. No. 5,615,287.
[51] Int. Cl.$^6$ ............................................. G06K 9/36
[52] U.S. Cl. ........................... 382/232; 382/269; 358/428
[58] Field of Search ............................ 382/232, 174, 382/229, 289, 269, 261; 348/364, 415, 411, 407, 416; 358/506, 428

[56] References Cited

U.S. PATENT DOCUMENTS

| | | | |
|---|---|---|---|
| 4,591,909 | 5/1986 | Kuroda et al. | 348/415 |
| 4,849,810 | 7/1989 | Ericsson | 348/416 |
| 4,945,406 | 7/1990 | Cok | 358/506 |
| 5,150,209 | 9/1992 | Baker et al. | 348/407 |
| 5,155,594 | 10/1992 | Bernstein et al. | 348/411 |
| 5,293,579 | 3/1994 | Stockholm | 382/269 |
| 5,294,998 | 3/1994 | Piovoso et al. | 358/428 |

Primary Examiner—Jose L. Couso
Assistant Examiner—Anh Hong Do
Attorney, Agent, or Firm—Henry P. Sartorio

[57] ABSTRACT

A method of storing information from filled-in form-documents comprises extracting the unique user information in the foreground from the document form information in the background. The contrast of the pixels is enhanced by a gamma correction on an image array, and then the color value of each of pixel is enhanced. The color pixels lying on edges of an image are converted to black and an adjacent pixel is converted to white. The distance between black pixels and other pixels in the array is determined, and a filled-edge array of pixels is created. User information is then converted to a two-color format by creating a first two-color image of the scanned image by converting all pixels darker than a threshold color value to black. All the pixels that are lighter than the threshold color value to white. Then a second two-color image of the filled-edge file is generated by converting all pixels darker than a second threshold value to black and all pixels lighter than the second threshold color value to white. The first two-color image and the second two-color image are then combined and filtered to smooth the edges of the image. The image may be compressed with a unique Huffman coding table for that image. The image file is also decimated to create a decimated-image file which can later be interpolated back to produce a reconstructed image file using a bilinear interpolation kernel.—(235 words)

22 Claims, 8 Drawing Sheets

SELECTIVE DOCUMENT IMAGE DATA COMPRESSION TECHNIQUE

CONTINUING APPLICATION DATA

This application is a continuation-in-part of U.S. patent application Ser. No. 08/348,431, filed Dec. 2, 1994, now U.S. Pat. No. 5,615,287 entitled IMAGE COMPRESSION TECHNIQUE, inventors Chi-Yung Fu and Loren I. Petrich, assigned to the assignee of the present invention, and hereby specifically incorporated by reference.

The United States Government has rights in this invention pursuant to Contract No. W-7405-ENG-48 between the U.S. Department of Energy and the University of California, for the operation of Lawrence Livermore National Laboratories.

BACKGROUND

1. Field of the Invention

The invention relates to still image compression techniques, and specifically to the selection and compression of certain essential information apart from background information in a document.

2. Description of Related Art

Financial institutions are required by law to retain certain types of financial information, such as an individual's or company's checking information, for a period of seven years. As a service, many institutions provide cancelled checks to the account holders on a regular (usually monthly) basis. Storing such information electronically is preferable to storing the information as paper hardcopy or micro-film, as is providing such information to an account holder in an electronic format. Because in many instances, an account holder enters information by hand, a digitized image of the information must be stored. The digitization of the information on forms such as bank checks is also important in the development of electronic banking.

Digitized images require a notoriously large amount of storage space to store and a notoriously large amount of bandwidth to transmit. A single, relatively modest-sized image, having 640 by 480 pixels and a full-color resolution of 24 bits per pixel (three 8-bit bytes per pixel), occupies nearly a megabyte of data. At a resolution of 1024 by 768 pixels, a 24-bit color screen requires 2.3 megabytes of memory to represent. A 24-bit color picture of an 8.5 inch by 11 inch page, at 300 dots per inch, requires as much as 25 megabytes to represent. For example, the front and back of a single check image at 240 pixels/inch image in grayscale, will require about 2 megabytes to store. If the resolution is increased, the required storage space likewise increases.

Traditional lossless techniques for compressing digital image and video information, such as Huffman encoding, run length encoding and the Lempel-Ziv-Welch algorithm, are far from adequate to meet this demand. For this reason, compression techniques which can involve some loss of information have been devised, including discrete cosine transform (DCT) techniques, adaptive DCT (ADCT) techniques, and wavelet transform techniques. Wavelet techniques are discussed in DeVore, Jawerth and Lucier, "Image Compression Through Wavelet Transform Coding", IEEE Transactions on Information Theory, Vol. 38, No. 2, pp. 719-746 (1992); and in Antonini, Barlaud, Mathieu and Daubechies, "Image Coding Using Wavelet Transform", IEEE Transactions on Image Processing, Vol. 1, No. 2, pp. 205-220 (1992), both incorporated by reference herein.

The Joint Photographic Experts Group (JPEG) has promulgated a standard for still image compression, known as the JPEG standard, which involves a DCT-based algorithm. The JPEG standard is described in a number of publications, including the following incorporated by reference herein: Wallace, "The JPEG Still Picture Compression Standard", IEEE Transactions on Consumer Electronics, Vol. 38, No. 1, pp. xviii–xxxiv (1992); Purcell, "The C-Cube CL550 JPEG Image Compression Processor", C-Cube Microsystems, Inc. (1992); and C-Cube Microsystems, "JPEG Algorithm Overview" (1992).

A brief description of the aforementioned processes and the disadvantages of each is discussed in the parent application, U.S. patent application Ser. No. 08/348,431.

The JPEG standard achieves still image compression ratios of about 10:1 to 20:1 or more, depending on the image and the user's standard for acceptable quality. While this is better than the compression ratios of standard lossless techniques, it is still inadequate considering the huge numbers of still and moving images which are likely to require storage and transmission in the near future. Wavelet-based compression techniques generally achieve compression ratios which are better than those achieved by DCT-based techniques such as JPEG, but they are still inadequate.

Other techniques exist for compressing still images, involving the separation of components of information from the original image. In Ran and Farvardin, "Adaptive DCT Image Coding Based on a Three-Component Image Model", 1992 IEEE International Conference on Acoustics, Speech and Signal Processing, Vol. 3, pp. 201-204 (1992), incorporated herein by reference, there is described a three-component technique in which what is referred to as "strong edge" information from a still image is encoded separately from the sum of a smooth portion of the image and a textured portion of the image.

The above techniques for compressing digitized images represent only a few of the techniques that have been devised. However, none of the known techniques yet achieve compression ratios sufficient to support the huge still and video data storage and transmission requirements expected in the near future. The techniques also raise additional problems, apart from pure compression ratio issues. Known image compression and decompression techniques which achieve high compression ratios often do so only at the expense of requiring extensive computations either on compression or decompression, or both.

Accordingly, there is an urgent need for a new image compression/decompression technique which achieves high compression ratios without sacrificing quality, and does so with a reduced requirement for extensive computations. Furthermore, there is an urgent need to apply such a compression/decompression technique to the storage of forms containing user-recorded information.

Certain other considerations arise when considering imaging and compression of forms such as bank checks. The sheer size of such information, for a single banking institution, can be in the thousands of terabytes. Thus, compression of image data is necessary for the efficient managing of such information.

Other considerations include the need for the imaged information to accurately reflect the hard-copy information after compression and decompression. Image quality must be high to enable fraud detection. For example, the imaging scheme must be accurate enough to enable accurate detection and depiction of the signature on the check. The amount and payee name on the check must be clearly legible. The use of different types of pens and ink must be anticipated. (For example, in any scheme using images in gray-scale, red ink presents a problem since red ink is represented by a light grey color which can be easily lost in signal processing by compression and may closely match the gray-scale representation of the check's background.) If possible, the storage scheme should improve enhancement of the image.

Another difficult area for imaging of bank checks is the reverse side of the check which may include several bank stamps which overlap each other and which may be implemented with varying light colors of ink.

Moreover, any compression scheme for use in the compression of forms such as bank checks must achieve a high compression ratio due to the sheer volume of checks that a bank must process in a given day. The volume of information gives rise to operational costs, storage costs and transmission costs. In terms of storage cost, for example, a large banking institution may process on the order of 10 million checks per day. Using current compression technology, a compressed image of one check requiring 50 Kbytes of memory at a cost of $3,000 per gigabyte of memory per year yields a storage cost of $1.5 million per day. Thus, an improvement in the compression ratio by a factor of 3 will result in a cost savings of $1.0 million per day. After 30-90 days, the data is generally archived on magnetic tapes; the total savings for this period could be on the order of $30-96 million per day. An equal amount of savings may be achieved in operational costs. Transmission costs result from the need to move the stored information from the storage site to, for example, the branch offices of a banking institution. Assuming that 1.0 billion checks are processed by a given institution during a given year, and one percent of this is required to be transferred to the branch offices, 10 million checks must be transferred. At 50 Kbytes per check, this amounts to 0.5 terrabytes of information. Using a 2400 baud modem, this results in $27.8 \times 10^6$ minutes of transmission per year; multiplied by $0.20 per minute the cost can average $5.56 million per year. If compression could be improved by a factor of three (3), the cost savings would be $3.7 million per year.

Total electronic banking could involve individuals and corporations having the ability to interact directly with the storage site for the financial institution and download the image data for their accounts directly. To implement this aspect of electronic banking, the compression/decompression scheme must utilize a decompression scheme which is not computationally intensive, since the computing power available on the transmission receiving end (the bank branch or an individual user) will not be as great as that available on the compressing end.

SUMMARY OF THE INVENTION

The techniques described herein for compressing and decompressing an image permit significantly improved compression ratios without loss of perceptual quality in the reconstructed image as compared to conventional image compression/reconstruction techniques, and individual steps can be performed quickly due to a novel compression technique.

The method is particularly applicable to the storage of bank check images, but can be utilized in other types of forms or documents used for recording information.

In one embodiment, roughly described, the invention comprises a method of storing documentary information comprising only retaining essential information and removing background information. This method is particularly useful for storing information on the front of checks. Generally, the method includes the steps of: extracting the user information from the background information; converting the user information to a two-color format; and compressing the user information. The information is presented in a digitized image array of pixels, each having a color value and position in the array.

More specifically, the extracting step involves enhancing the contrast of the pixels by performing a gamma correction or other contrast enhancing operation on the array; enhancing the pixel-representing edges and de-emphasizing pixels representing background information by performing a filtering operation on said pixels; identifying pixels of the image array being edge pixels lying on edges of said image; converting adjacent pairs of edge pixels to black and white color values; determining the distance of each black pixel in the array from neighboring pixels in a number of directions in the array and converting each such pixel having no nearby neighbors inside a given window of such distances to a white color value; and creating a filled-edge array of pixels each corresponding to a respective pixel in said image array.

Additionally, the converting step of the method comprises the sub-steps of: creating a first two-color image of the scanned image by converting all pixels darker than a threshold color value to black and all pixels brighter than the threshold color value to white; creating a second two-color image of the filled edge file by converting all pixels darker than a second threshold value to black and all pixels brighter than the second threshold color value to white; combining the first two-color image and the second two-color image; and filtering the combined image to remove stray pixels which may create jagged lines.

The combined image may then be compressed using either CCITT group 4 compression or a modification thereof having an image-specific optimized Huffman coding table. The compression step may further include providing an optimized Huffman table for each image compressed or a compression algorithm suitable for compressing such images.

In a further aspect, a method for compressing an image file is provided, which includes decimating the image file to create a decimated image file (J[a1,a2]), the image file comprising a plurality of image pixels having a dimension n1*n2, such that the image file is decimated in each dimension n1*n2, by factors of p1 and p2, the decimated image file having dimensions m1*m2; and compression using the JPEG standard for still frame compression. The decompression and reconstruction method to retrieve the data comprises decompressing the decimated image file followed by interpolating the decimated image file to produce a reconstructed image file ($I_{res}$[i1,i2]) using a bilinear interpolation kernel.

BRIEF DESCRIPTION OF THE DRAWINGS

The invention will be described with respect to particular embodiments thereof, and reference will be made to the drawings, in which.

DETAILED DESCRIPTION

Figure 1:
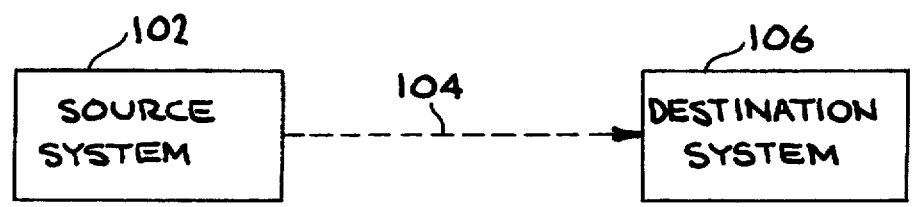
FIG. 1 is an overall block diagram illustrating apparatus incorporating the invention.

FIG. 1 is an overall block diagram illustrating a general apparatus incorporating the invention. It comprises a source system 102, a transmission medium 104, and a destination system 106. The source and destination systems can be computer systems or dedicated hardware units, and the transmission medium 104 can include parts of a cable television network, computer network, radio link, satellite link (or any other wireless links), data storage medium (such as a floppy disk or CD-ROM) which is hand carried from the source system 102 to the destination system 106, or any other medium by which information can be transmitted from a source to a destination. Additionally, although not illustrated in FIG. 1, the invention can be implemented in the manner in which the source and destination are two separately executing processes running on a single computer system, either concurrently or separated in time; in this case the transmission medium 104 might include local volatile memory, a local cache memory, a local bus, and/or a local or network mass storage device.

Figure 2:
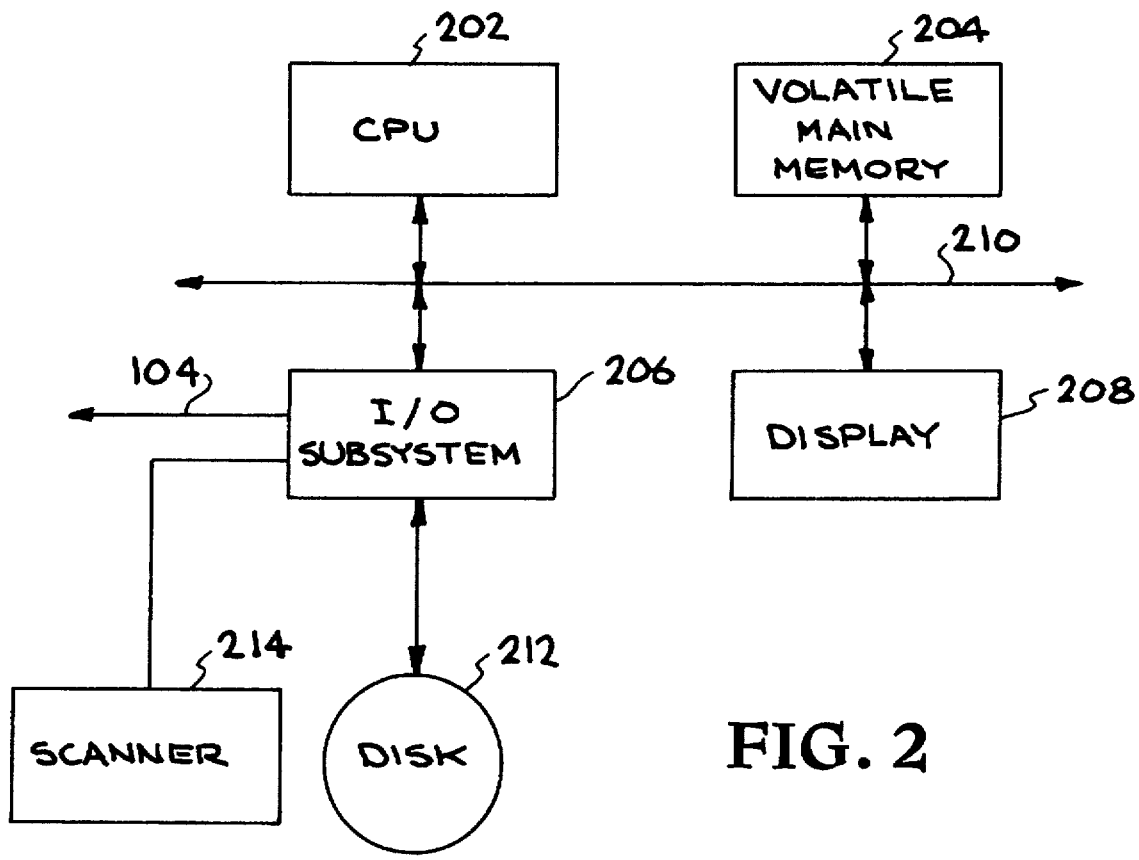
FIG. 2 illustrates a typical hardware computer system platform which in one embodiment executes software for implementing the invention.

Although no particular hardware platform is required to implement the present invention, FIG. 2 illustrates a possible, general hardware platform, in this case a computer system platform, which in one embodiment executes software for implementing the invention. The computer system of FIG. 2 comprises a CPU 202, main memory 204, which may be volatile, an I/O subsystem 206, and a display 208, all coupled to a CPU bus 210. The I/O subsystem 206 communicates with peripheral devices such as a disk drive 212, and a scanner 214. In operation, a computer program implementing aspects of the invention is retrieved from the disk 212 into main memory 204 for execution by the CPU 202. If the system of FIG. 2 represents a source system 102 (FIG. 1), then one or more source images can be located on the disk drive 212 or provided by an external source, such as scanner 214. These images are retrieved by the CPU 202, running under the control of the computer program. The CPU operating under the control of the computer program processes the images in the manner set forth herein, and either stores them back on disk 212 or transmits them over the transmission medium 104 (FIG. 1) to the destination system. If the computer system of FIG. 2 represents the destination system 106 (FIG. 1), then it receives the compressed image or images over the transmission medium 104, and in accordance with a decompression computer program which the CPU 202 retrieved from the disk 212, decompresses them and outputs them either back to the disk 212, or to the display 208, or to some other device (not shown).

A processing hardware platform for implementing the compression and decompression scheme of the present invention is discussed below with respect to FIG. 10.

It is worthwhile noting that the invention concerns manipulation of physical signals representing image values, not merely manipulation of the abstract values themselves, although the reasons for manipulating the physical signals in the manner herein described derive from the mathematical manipulations of the numeric values that the physical signals represent. The invention also concerns manipulation of physical signals representing the position of a value in an array, as well as physical signals indicating other information as described more fully herein. The physical signals may be, for example, electrical signals having a voltage which, when above a predefined threshold represent a logic 1, and which, when below a predefined threshold represent a logic 0. The physical signals representing a value may be carried on several conductors (for example, if the value is represented in binary), and thus the physical signals representing such a value may comprise a group of physical signals. At times the physical signals are stored in the state of a flip-flop, latch, capacitance or other storage circuit in the systems 102 and 106 (FIG. 1).

It is to be noted also that in many instances it is convenient to describe physical signals in terms of the numbers they represent. For example, the following description uses phrases such as calculating a derivative. This is to be read merely as a shorthand way of defining not only the underlying mathematical steps performed by the circuitry on the values represented by the physical signals, but also the physical steps of receiving signals representing the values, performing a manipulation of those signals corresponding to the mathematical steps, and generating physical output signals representing the indicated result. Such a phrase is further to be read as implying that a finite time is required to propagate signals through the circuitry which performs the manipulation. In similar fashion, other phrases used herein are to be read merely as a shorthand way of defining the physical steps of receiving signals representing values, performing a manipulation on the signals which corresponds to the described function, and generating physical output signals representing the result. The invention also concerns the transmission of information via a physically real medium such as a transmission line or a storage element.

In view of the above, it is understood that the present invention deals with physical entities such as physical signals that represent various numeric values, with physical media, and with image processing hardware that inputs, processes and outputs such physical signals, as well as image data signals which can ultimately cause a physical light image to be rendered and observed by a viewer, for example, on a display.

The present invention takes advantage of the fact that, in some circumstances, it is only necessary to store a portion of the information on a document in a digitized image, and thus non-essential or "background" information may be eliminated before the necessary information is compressed and either stored or transmitted. One useful circumstance wherein such a technique can be utilized is storage of information recorded on forms, such as bank checks, where such forms might include colored background information, which is not of interest, and data entered on the check by the account holder, which is of interest.

The invention will therefore be described with reference to uses in the financial service industry on transaction forms such as personal checks. However, it should be understood that the uses of the invention are not so limited and that this invention may be utilized in a number of applications. In one embodiment, the present invention involves the use of compression techniques utilized and described in the parent application, U.S. patent application Ser. No. 08/348,431, to select the necessary image information and to eliminate un-necessary background information to allow compression of such necessary information by extracting and isolating the edge pixels of a digitized image. In the context of bank checks, the term "background information" refers to the design pattern and artwork on printing stock upon which a financial institution's identifying rinformation and customer account information is printed. Thus, it would not include a bank logo or other identifying information.

Roughly, edges are pixels which lie at a perceived border between two regions of the image, and typically carry much of the information which a viewer perceives in an image. The edges can be considered to be located on the pixels themselves, in which case only one pixel is identified for each edge, or preferably, edges can be considered to be located between pixels, in which case each of the two adjacent pixels are considered to be edge pixels. The latter formulation is used in the present embodiment.

Figure 3A:
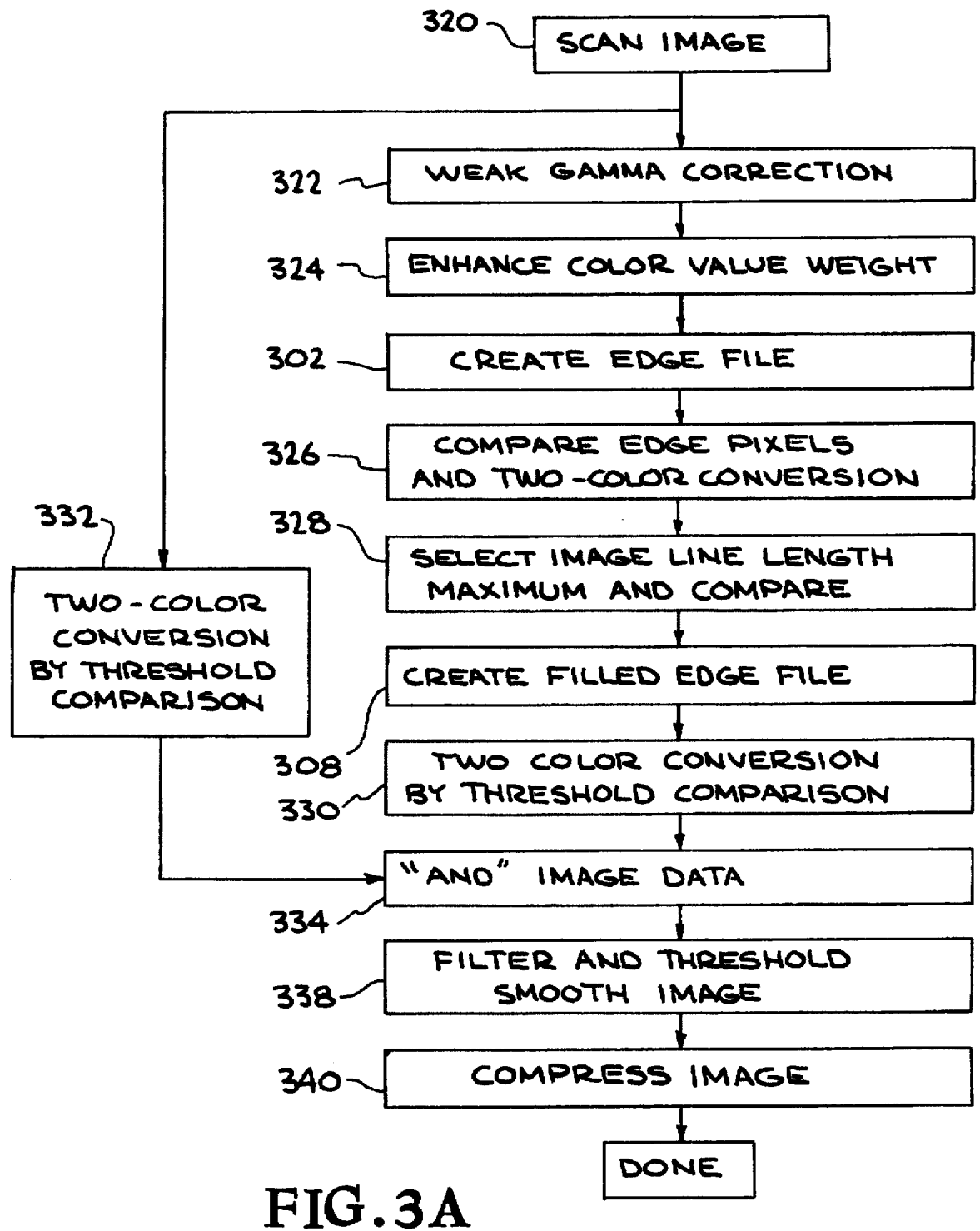
FIGS. 3A and 3B are flow charts illustrating process steps used to compress an image according to an embodiment of the invention.
Figure 3B:
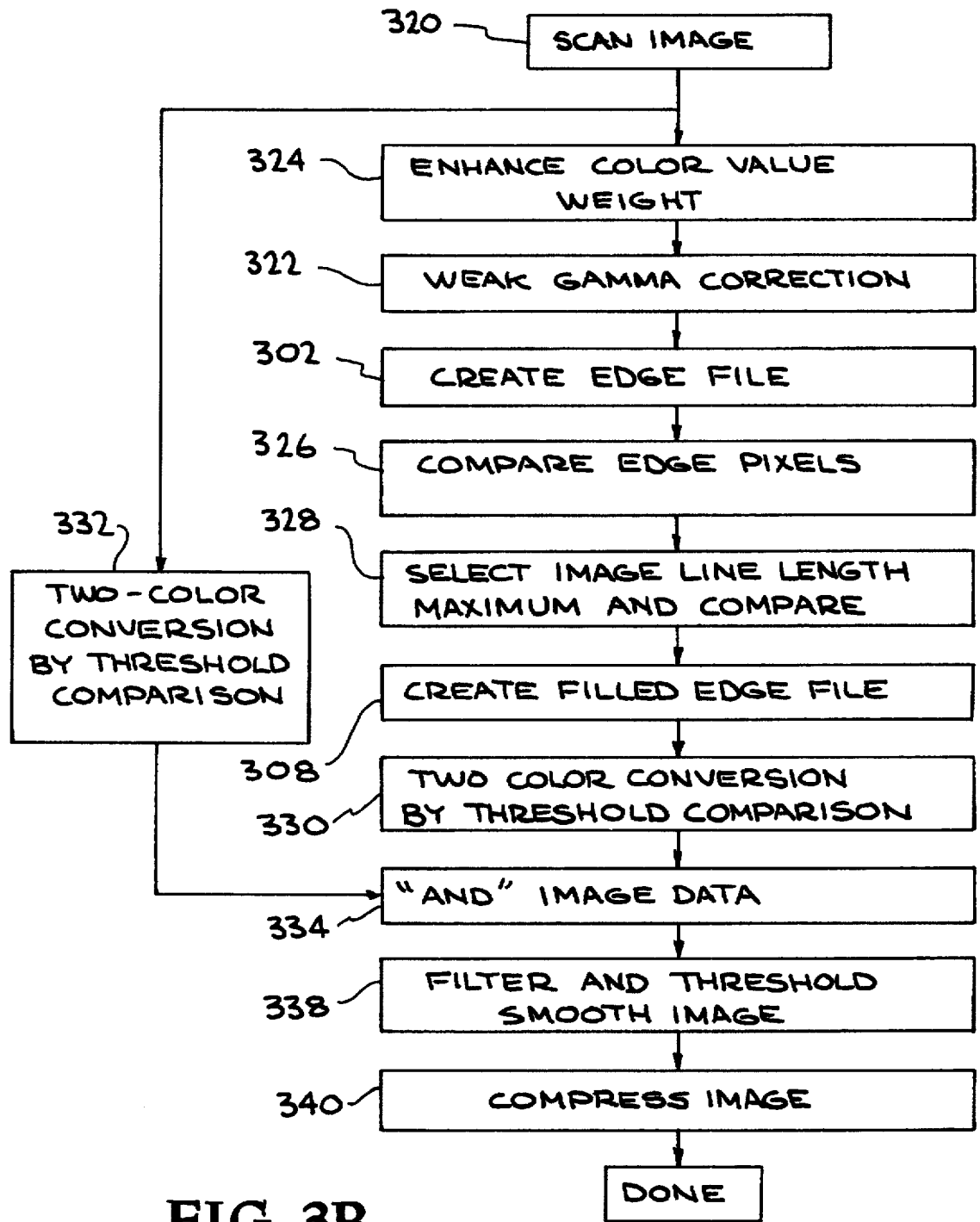

FIGS. 3A and 3B are flow charts illustrating the process steps used to compress an image according to one embodiment of the invention wherein background information in the image is separated from essential information, and only the essential information is stored. Initially, at step 320, a check image is scanned by any number of conventional methods and apparatus to provide a digitized image array file. Preferably, the image is scanned in gray-scale. Thus, if the image is gray-scale, then only one color plane is present, each pixel having associated with it a single value indicating a gray level for the pixel. However, the invention is not limited to use with gray-scale images and if the image is a color image, then three color planes may be present, each pixel having associated with it three values indicating respective brightness levels for red, green and blue components of the pixel color. It will be understood that the red, green and blue color axes can be used in the presently described embodiment, or other color axes, such as (red minus yellow), (blue minus yellow) and luminance, can be used instead.

Moreover, the array may be represented physically as a one-dimensional list of values, each at a respective address. The array is considered to be a two-dimensional array, however, since a predefined formula exists which maps any pair of address values (x,y) to a respective unique element in the list. If the image has three color planes, then a third coordinate value might be provided as well to indicate the particular color plane being selected for each pixel.

Additionally, each element in the image array is referred to herein as a "pixel" because it corresponds to a respective discrete square or rectangle when the image is displayed. Specifically, the array is considered to have a horizontal dimension because when displayed, horizontally sequential ones of the pixel rectangles on the display will be displayed with colors (or gray levels) responsive to the color values stored in the array at a fixed coordinate in one dimension (the vertical dimension) and at sequential coordinates in the other (second) dimension (the horizontal dimension). Similarly, the array is considered to have a vertical dimension because when displayed, vertically sequential ones of the pixel rectangles on the display will be displayed with colors (or gray levels) responsive to the color values stored in the array at a fixed coordinate in the second dimension (horizontal dimension) and at sequential coordinates in the first dimension (vertical dimension).

The flow charts of FIGS. 3A and 3B illustrate the processing of a single still image. While steps are illustrated as being performed sequentially, with each step completed before the next step begins, it will be understood that the process can be pipelined in many instances such that subsequent process steps begin before prior process steps are completed. If a sequence of images is being processed, the processing of one image may begin before the processing of a prior image is completed. Additionally, different images or different parts of an image might be processed according to the process steps of FIGS. 3A and 3B in parallel on separate hardware, and/or different steps of the process of FIGS. 3A and 3B with respect to a single image can be performed in parallel on different hardware. The steps illustrated in FIGS. 3A and 3B (and their detail flow charts) can also be rearranged in some instances without changing the overall functions which are illustrated in the figure. (Indeed, the process shown in FIG. 3B differs from that in FIG. 3A by the ordering of steps 322 and 324.)

As used hereinafter, the term "color value" will be understood to include a "gray-scale value" if the image is a gray-scale image. Also as used herein, the term "file" is used merely to represent a collection of information; it is not necessarily stored separately as a file in a file system in a computer mass storage device. If indeed it is stored in a computer mass storage device, it may occupy only part of a file system file, exactly one file system file, or more than one file system file depending on the implementation.

As used hereinafter, the term "bank check" refers to a draft document for the payment of funds from any recognized institution. The "front side" of the check refers to the side of the check which generally contains the institution's identification number, the payee, the account number and other written information, including logos and form information. The "back side" of the check refers to the area generally used by financial institutions and the payee to endorse the check.

Roughly, the method steps set forth in FIGS. 3A and 3B are highly suited for storing information contained in the image on the front side of a check. Steps 322, 324, 302, 326, 328, 308, 330 and 334 are utilized to remove background data from essential data on one side of a completed bank check form. Once this data is extracted, the necessary data is filtered and compressed in accordance with well known techniques.

Referring to FIG. 3A, the image array which results from step 320 is first subjected, at a step 322, to a weak gamma correction, pixel by pixel, to either increase or decrease brightness in all but black and white pixels thereby enhancing strong edge pixels and distinguishing them from weaker, non-edge pixels, in accordance with the following equation:

$$I^{new} = I^{max} \left( \frac{I^{old}}{I^{max}} \right)^{\frac{1}{\gamma}}$$

γ=gamma

For gamma >1, the gamma correction remaps the color of each pixel so that the intensity of each color increases, e.g. blackish pixels become a little less black, whitish pixels become more white, and the color range signature is, in essence, stretched to enhance the contrast between pixels in the lower section of the range. Generally, this will mean that the pixels representing essential data will stand out against background data pixels.

In a step 324, a filtering step is performed to enhance strong edges and soften weak edges. Filtering step 324 may be performed pixel-by-pixel or, to increase throughput, on a group of pixels at one time. A modified color value is given by weighing the value relative to the position of the pixel according to the function $I = w(\vec{\Delta x} . \vec{\Delta I})$, where w is any of several suitable weighted area sampling functions where one choice of $w(\Delta\vec{x},\Delta\vec{I})$ is $w_x(\Delta\vec{x})w_I(\Delta\vec{I})$. This choice has certain advantages in computation, but a more ideal choice would be:

$$w\left[\left(\frac{\Delta\vec{I}}{I_o}\right)^2 + \left(\frac{\Delta\vec{x}}{X_o}\right)^2\right]$$

(where $I_0$ and $X_0$ are constants). The weight function is chosen so as to have the property that it decreases as the absolute value of $\Delta\vec{x}$ and the absolute value of $\Delta\vec{I}$ increase. Thus, during step 324, a modified color value for each "i'th" pixel is achieved by iterating the following equation until it converges for the i'th pixel:

$$\vec{I}_i^{mod} = \frac{\sum_k w(\vec{x}_k - \vec{x}_i, \vec{I}_k - \vec{I}_i^{mod}) \cdot \vec{I}_k}{\sum_k w(\vec{x}_k - \vec{x}_i, \vec{I}_k - \vec{I}_i^{mod})}$$

where:

$\vec{I}_i^{mod} = \vec{I}_i$ is the initial condition.

$\vec{I}_j$ is the color value (scalar for gray scale, 3 vector for full color) for any j'th pixel $\vec{x}_j$ is a vector indicating the horizontal and vertical coordinates of any j'th pixel In the case where w() is separable in $\vec{x}$ and $\vec{I}$, that is $w(\Delta\vec{x},\Delta\vec{I})=W_x(\Delta\vec{x})w_I(\Delta\vec{I})$ for some functions $w_x$ and $w_I$, the following equation is iterated for each i:

$$\vec{I}_i^{mod} = \frac{\sum_k w_x(\vec{x}_k - \vec{x}_i) \cdot w_I(\vec{I}_k - \vec{I}_i^{mod}) \cdot \vec{I}_k}{\sum_k w_x(\vec{x}_k - \vec{x}_i) \cdot w_I(\vec{I}_k - \vec{I}_i^{mod})}$$

$\vec{x}_i$ is a vector indicating the horizontal and vertical coordinates of pixel i.

In general, the weight function w() enhances a given pixel's color value I relative to the displacement of the pixel in the filter sample. The weight function has two components, a pixel displacement portion ($w_x$) and a color value portion ($w_I$). The displacement portion of the weight, $w_x(dx,dy)$ is a function of the displacements, dx and dy. For computational ease, the displacement portion of the weight can be referred to as the absolute value of the displacement distance:

$$r = \sqrt{(dx^2 + dy^2)}$$

(the radial distance in polar coordinates).
The function utilized in one embodiment is:

for r=0 to r=1, w=1 for r=1 to r=2, w=1−(r−1)

for r>2, w=0

In effect, the following weight values are used:

0.6 1.0 0.6

1.0 1.0 1.0

0.6 1.0 0.6 because the distances from the center are:

2.8 2.2 2.0 2.2 2.8

2.2 1.4 1.0 1.4 2.2

2.0 1.0 0.0 1.0 2.0

2.2 1.4 1.0 1.4 2.2

2.8 2.2 2.0 2.2 2.8 where the center value (0.0) refers to the pixel being determined.

The color value portion of the weight function ($w_I$) is simply a thresholding function, with all values below a certain threshold being retained, and all values above the threshold being omitted. As shown in FIG. 3B, in an alternative embodiment, gamma correction step 322 may follow filter step 324.

Following filter step 322, as shown in FIG. 3A, or the gamma correction at step 324, in FIG. 3B, in a step 302, edges, or color boundaries, are identified in the image in a manner hereinafter described. In step 302, a file is created which identifies each of the edge pixels in the image array, together with their color values. The particular method for creating the edge file is described below.

An edge file is then created at step 326. It is constructed using an edge-strengthening step which involves a comparison between sets of neighboring pixels such that, for each identified edge-pixel set, one pixel is converted to black while the adjacent pixel is converted to white, thereby enhancing the edges detected in the image. The values of each of the pixels are then fixed throughout subsequent processing steps.

At step 328, the edge file is subjected to a second comparison of all black pixels relative to adjacent black pixels based upon a minimum line length between the pixels. Typically, information imparted by the writing of a customer and textual information printed on the check will usually result in adjacent black pixels in several directions being only a small linear distance from adjacent black pixels. Thus, a pixel not having a given number of pixels adjacent to it will likely not be essential information. At step 328, for each black pixel, the distance between it and the next adjacent pixel in all directions is determined. The next step is to look at contiguous sets, such as sets of three. If each contiguous set or window has at least one close pixel, then the original pixel is unchanged. If there is at least one window with no nearby pixels of any color, the original pixel becomes white. This step eliminates background pixels which are not essential information but which might otherwise have been considered as such. Typical line length selections can be on the order of 16–32 pixels. It is possible that items such as bank logos, which one may desire to retain in the image, will be eliminated in this step. However, any essential information which is inadvertently deleted will be recovered in step 334.

The compared edge file created in step 328 is then used in step 308 to create a "filled" edge file. Techniques for filling an edge file are described hereinafter, but roughly, the step involves first creating an array corresponding to the original image array, and copying in the values of only the edge pixels. The filled edge array is then obtained by smoothing the remaining pixels of the image containing the edge array in such a way as to minimize the color-value gradients of the image, while keeping the edge pixels fixed. The most accurate solution to the problem is obtained by solving Laplace's equation, taking the edge pixels as boundary conditions in the solution of the partial differential equation:

$$\frac{\partial^2 u}{\partial x^2} + \frac{\partial^2 u}{\partial y^2} = 0$$

where u represents the color value of a pixel and x and y represent its coordinates in the image. The term "boundary condition" is used herein in its partial differential mathematical sense; it is not intended to refer to borders of the image. For color images, Laplace's equation is solved independently in each color plane.

A novel technique for solving Laplace's equation for such conditions is given in parent application Ser. No. 08/348, 431. Roughly, it is desirable that each non-edge pixel in the array, for a given color plane, have a resulting value which is a weighted average of all of the edge pixels which surround it. In the weighted average, each edge pixel should have a contribution which decreases as the edge pixel becomes more distant from the pixel value being computed. The contribution need not be exactly proportional to the inverse distance, although that could work as well. Also, other edge pixels in addition to those immediately surrounding a subject non-edge pixel could influence the weighted average as well in a given embodiment. In general, the value to be assigned to each non-edge pixel j in the array is given by $$I(\vec{x_j}) = \sum_i G(\vec{x_j},\vec{x_i})I(\vec{x_i}),$$

where:

| | |
|---|---|
| $\vec{x_j}$ | is a vector indicating the horizontal and vertical coordinates of the non-edge pixel j, |
| $i$ | is the number of an edge pixel, |
| $\vec{x_i}$ | is a vector indicating the horizontal and vertical coordinates of the edge pixel i, |
| G | is a weighing array typically calculated for the subject image. |

Another method for solving Laplace's equation is set forth in the Ran paper incorporated above.

At step 330, a two color reduction of the edge grown file generated at step 308 is performed. All pixels brighter than a threshold color value are converted to white, and those darker than the threshold are converted to black. At completion step 330, a first set of necessary data will have been extracted from the original image. However, it is possible that some desired components of the data will have been lost in the extraction. For example, retention of the financial institution's logo may be desired and if all or part of the logo has a portion with a wide line width, it may cause some pixels to be converted to white in step 328.

At step 332, a low-level thresholding is applied to the original scanned image resulting from the step performed at 320. Step 332 can be performed at any time in the sequence of steps following scanning the original image and the particular timing of the step 332 as represented in FIG. 3 is not necessarily indicative of the time sequence involved in when the step is accomplished. The high level thresholding results in a two-color version of the original image and, because of the low level of the color value selected, only black or near black pixels will be turned to black in this file. Black or near-black pixels are typically used to represent bank logos against the background of the check.

At step 334, a combined file is created by comparing the compared image file of step 330 with the threshold file of the original image file from step 332 (where black pixels are assigned a value "0" and white a value of "1" in the Boolean AND table). This function is performed pixel by pixel, such that if at least one of the original pixels is black, the resulting pixel will be black. The purpose of this step is to recover data which is relevant but may be eliminated by steps 320–332 and 302, 308, such as bank logos and the like, without reinserting the background information into the file. At step 338, a filtering step is performed to reduce the jaggedness of any line edges which results from stray pixels. Such details consume image file space while adding no essential information to the file. Step 338 involves filtering of the combined image, followed by threshold comparison to convert the image back to black and white. A shortcut method for performing this step may be performed by adding the number of white pixels in a block around a pixel, and setting the original pixel white if it has enough white neighbors, itself included.

Finally at step 340, the data is compressed by means of, for example, CCITT Group 4 compression or a variation of Group 4 compression or any other such algorithm. While it is acceptable to use standardized Huffman tables for the Group 4 compression, an optimized Huffman table may be generated for each image compressed. The table is generated in accordance with well-known principles based on the composition of the image. The customized Huffman tables for each document in a set of images may then be transmitted or stored with the image and used for decompression. Thus, decompression of the data is made relatively nonintensive in computation, and can be performed using a standard personal computer.

Figure 4:
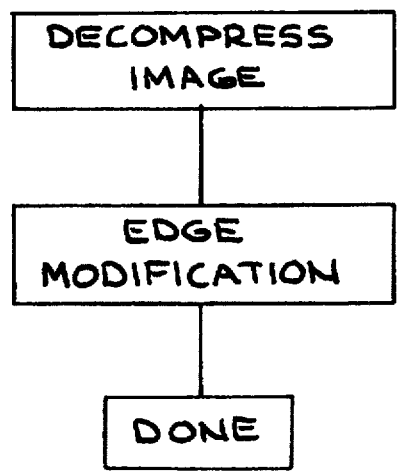
FIG. 4 is a flow chart illustrating steps performed by a destination system upon receipt of an image compressed using the procedure of FIG. 3.

FIG. 4 is a flow chart illustrating the steps performed by the destination system 106 upon receipt of an image compressed using the procedure of FIG. 3. In a step 420, the image is decompressed using the inverse of the compression algorithm utilized in step 340. Because the total overall image, including, for example, the color background, is not required, and only a two color image of the user-recorded information needs to be retrieved, the de-compressed image will represent the entire data which has been extracted, and no further decompression or modification of the image is required.

Additional anti-aliasing processes, such as a filtering step 422, may be utilized to smooth the edges of the image smoothing by removing rough edges generated by compression steps. The edge enhancing steps will result in an un-natural appearance of stark edges. Filtering step 422 may be used to add grey scale values to pixels adjacent to edges to yield a more natural appearance.

Figure 5:
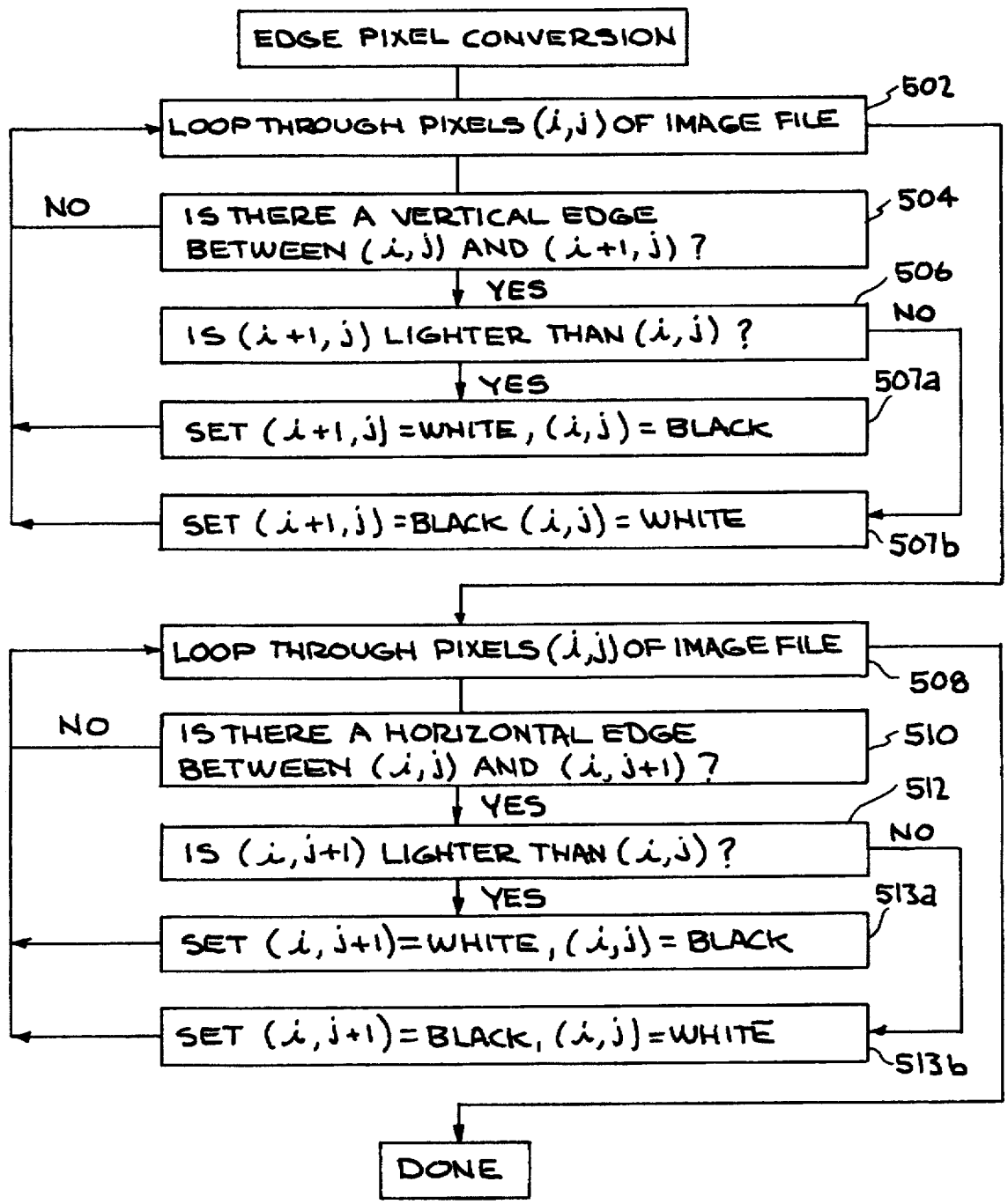
FIG. 5 illustrates a flow chart describing a technique for converting the edge pixels in FIG. 3.

FIG. 5 illustrates a flow chart describing a technique for extracting the edge pixels in step 302 (FIG. 3). Other, less preferred techniques, are set forth in Schuster, Ansari and Bani-Hashemi, "A Hierarchical Edge Detector Using the First and Second Derivative Operators", SPIE, Vol. 1825 Intelligent Robots and Computer Vision XI, pp. 230–241 (1992); Kunt, Bénard and Leonardi, "Recent Results in High-Compression Image Coding", IEEE Transactions on Circuits and Systems, Vol. CAS-34(11), pp. 1306–36 (1987); in Carlsson, "Sketch Based Coding of Gray Level Images", Signal Processing, North Holland, Vol. 15, pp. 57–83 (1988); and the paper by Ran and Farvardin mentioned above. All of such publications are incorporated herein by reference in their entirety. Many other techniques are also available, but are less preferred than the technique described herein.

Referring to FIG. 5, steps 502 and 504 search for vertical edges between horizontally adjacent pixels in the original image file, and steps 508 and 510 search for horizontal edges between vertically adjacent pixels in the original image file. Specifically, in step 502, all of the pixels (i,j) in the original image array are traversed in a loop. In step 504 of the loop, a determination is made as to whether a vertical edge exists in the image between the current pixel (i,j) and the horizontally next pixel (i+1,j). If not, then the loop continues at step 502. If so, then in step 506, a determination is made as to whether pixel (i+1,j) is lighter than pixel (i,j). If so, at step 507a, the two edge pixels are converted such that one edge pixel (i+1,j) is set to white, while the adjacent pixel (i,j) is set to black; if not, at step 507b, pixel (i+1,j) is set to black, while pixel (i,j) is set to white to indicate that an edge exists between the two indicated pixels in the original image file.

Figure 6:
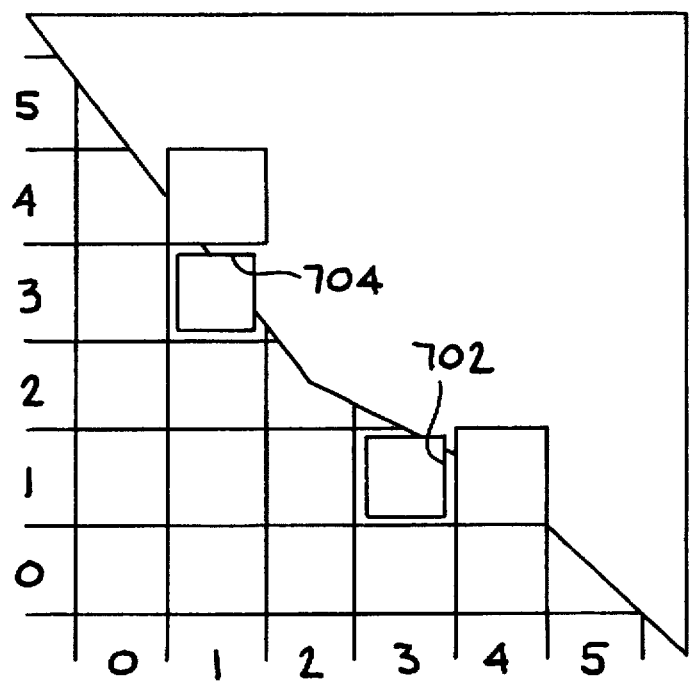
FIG. 6 shows conversion of edge pixels of an image being compressed.

This is best illustrated in FIG. 6, which shows a portion of the original image having 20 pixels numbered (i,j)=(0,0) through (5,5). The image array pixels are represented by the spaces within the rectangles in the grid of FIG. 6, and a vertical edge 702 is shown between pixels (3,1) and (4,1).

In step 508, all of the pixels in the image file are again examined in a loop, and in step 510, it is determined whether a horizontal edge exists between pixels (i,j) and (i,j+1) in the original image. Such an edge is illustrated as 704 in FIG. 6. If the edge is detected in step 510, then in step 512 a determination is made as to whether pixel (i,j+1) is lighter than (i,j). If so, at step 513a, pixel (i,j+1) is set to white and (i,j) to black; if not, at step 513b, pixel (i,j+1) is set to black while (i,j) set to white. The loop then continues in step 508 until all pixels have been examined.

Figure 7:
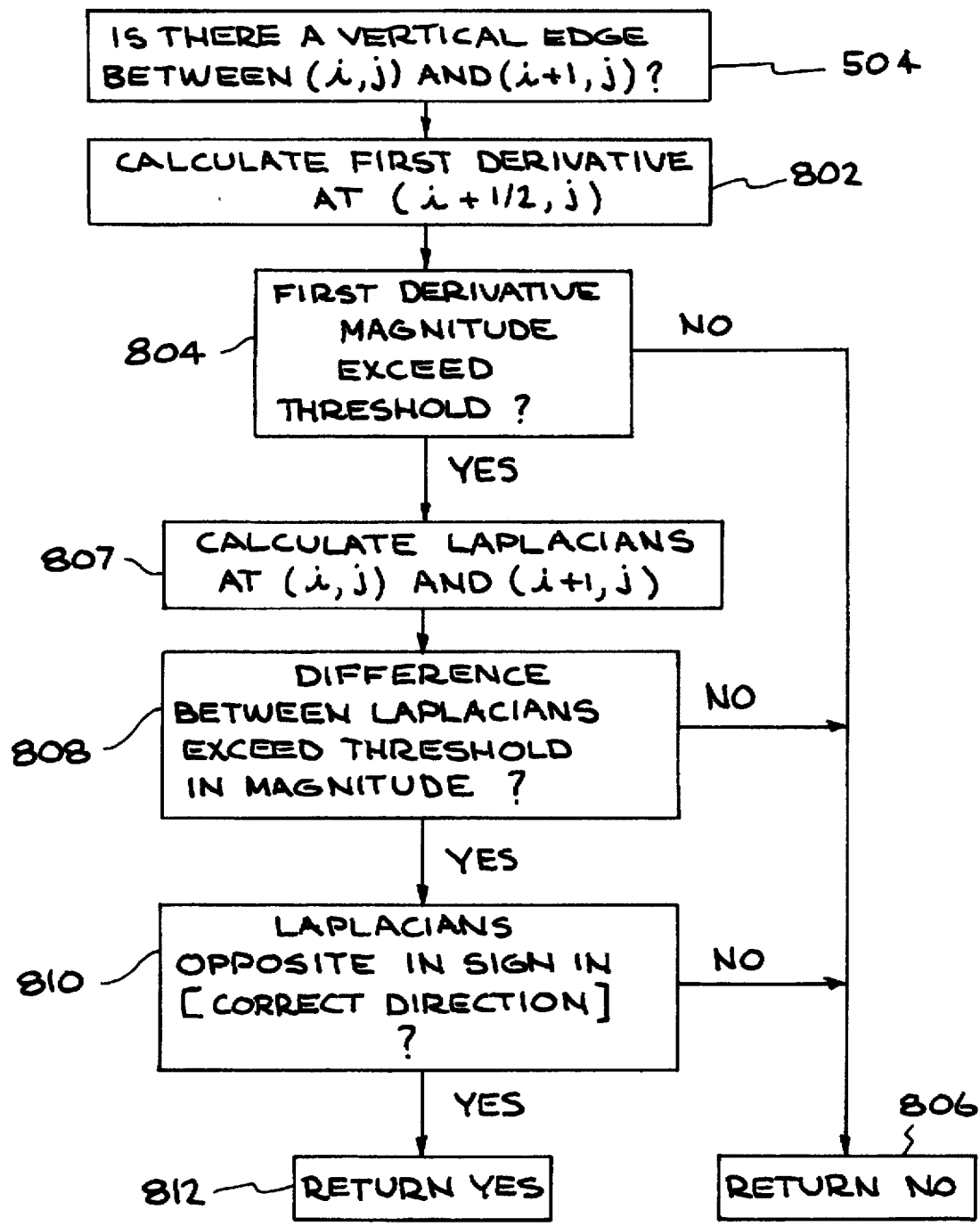
FIG. 7 is a flow chart of a procedure for performing step 504 in FIG. 5.

The step 504, in which it is determined whether a vertical edge exists between pixels (i,j) and (i+1,j), is performed using local first and second derivatives of the image. The motivation for using both first and second derivatives is that the first derivative is less sensitive to noise than the second derivative, while the second derivative allows for precise localization of an edge. FIG. 7 is a flow chart setting forth this procedure. Referring to FIG. 7, in a step 802, the first derivative is calculated at pixel position (i+½,j). This is accomplished by taking the dot product of a four-pixel by three-pixel sub-array of the image array, centered at the subject interface between pixels (i,j) and (i+1,j), and a first-derivative operator given by:

$$\begin{bmatrix} -1 & -1 & +1 & +1 \\ -1 & -1 & +1 & +1 \\ -1 & -1 & +1 & +1 \end{bmatrix}$$

(or something similar). Note that the first derivative operator can be "centered" at (i+½,j) because the operator contains an even number of elements in the horizontal dimension.

In a step 804, it is determined whether the magnitude of the first derivative exceeds a threshold. If not, then there is no vertical edge between (i,j) and (i+1,j) (step 806). If the magnitude of the first derivative does exceed the threshold, then in step 807, Laplacians are calculated at pixels (i,j) and (i+1,j) (i.e. at each of the two horizontally adjacent pixels on opposite sides of the location where a vertical edge is being tested for). A Laplacian is a second derivative, and in the present embodiment is calculated at a given pixel by multiplying (dot product) a 3 by 3 pixel sub-array centered at the given pixel, by the following Laplacian operator:

$$\begin{bmatrix} +1 & +1 & +1 \\ +1 & -8 & +1 \\ +1 & +1 & +1 \end{bmatrix}$$

(or similar).

If the magnitude of the difference between the Laplacians at the two adjacent pixels do not exceed a threshold, then an edge at the subject location is assumed not to exist (steps 808 and 806). If the magnitude difference does exceed the threshold, then it is determined whether the Laplacians are opposite in sign, and opposite in the correct direction given the sign of the first derivative calculated in step 802 (step 810). The Laplacians are opposite in sign in the "correct direction" if the gradient between them has a sign opposite that of the first derivative. If this last test is satisfied, then an edge has been located (step 812); if not, then an edge has not been located (step 806).

Figure 8:
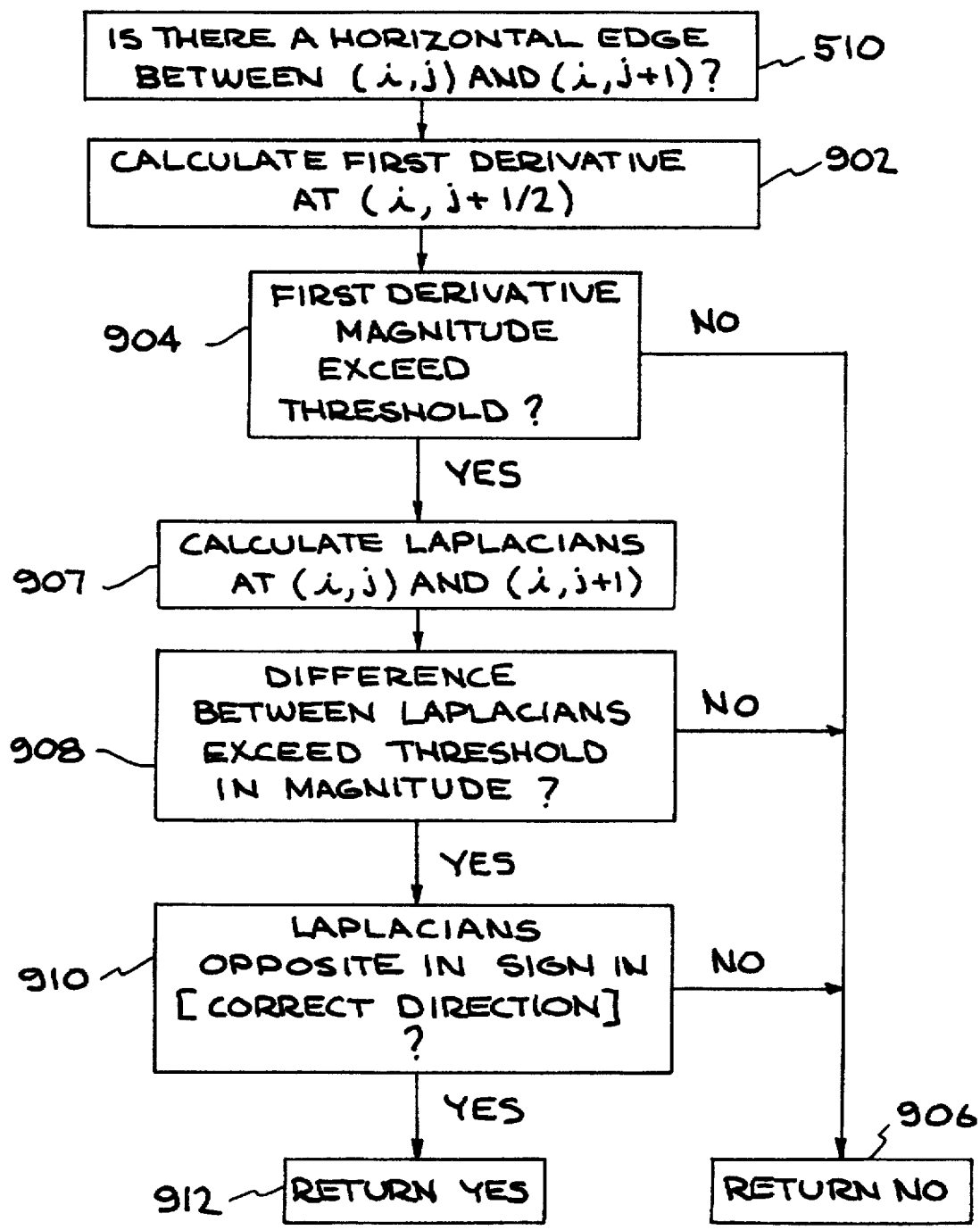
FIG. 8 sets forth a procedure for performing step 510 in FIG. 5.

Similarly, FIG. 8 sets forth the procedure for determining whether there is a horizontal edge between (i,j) and (i,j+1) (step 510 of FIG. 5). The procedure is similar to that of FIG. 7, except that the adjacent pixels which are being examined are vertically adjacent rather than horizontally adjacent, and the first derivative operator is the transpose of that used in FIG. 7.

Referring to FIG. 8, in a step 902, the first derivative is calculated at pixel position (i,j+½). This is accomplished by taking the dot product of a three pixel by four pixel sub-array of the image array, centered at the subject interface between pixels (i,j) and (i,j+1), and a first derivative operator given by:

$$\begin{bmatrix} -1 & -1 & -1 \\ -1 & -1 & -1 \\ +1 & +1 & +1 \\ +1 & +1 & +1 \end{bmatrix}$$

(or similar). Note that the first-derivative operator can be "centered" at (i,j+½) because the operator contains an even number of elements in the vertical dimension.

In a step 904, it is determined whether the magnitude of the first derivative exceeds a threshold. If not, then there is no horizontal edge between (i,j) and (i,j+1) (step 906). If the magnitude of the first derivative does exceed the threshold, then in step 907, Laplacians are calculated at pixels (i,j) and (i,j+1) (i.e. at each of the two vertically adjacent pixels on opposite sides of the location where a horizontal edge is being tested for. The Laplacian is calculated using the transpose of the dot product operator set forth above for FIG. 7, which in the present case is the same as such dot product operator.

If the magnitude of the difference between the Laplacians and the two pixels do not exceed a threshold, then an edge at the subject location is assumed not to exist (steps 908 and 906). If the magnitude difference does exceed the threshold, then it is determined whether the Laplacians are opposite in sign, and opposite in the correct direction (as defined above) given the sign of the first derivative calculated in step 902 (step 910). If this last test is satisfied, then an edge has been located (step 912); if not, then an edge has not been located (step 906).

Referring to FIGS. 3A and 3B, the step 308 of creating a filled edge file from the edge file essentially involves solving Laplace's equation taking the edge pixel values as boundary conditions. Another, less preferred, method for solving Laplace's equation is set forth in the Ran paper incorporated above.

Preferably a multi-grid method is used to solve Laplace's equation. In this method, roughly described, a finest-level grid is created in which the edge pixels are fixed as boundary conditions. A next-coarser-level grid is then created, and the boundary conditions are copied up to the next coarser-level grid wherever possible. Laplace's equation is then solved at such next-coarser level (either by a conventional technique or, preferably, by recursively copying the boundary values up to still coarser grid levels), and the results copied back down to pixels in the finest-level grid which are not already fixed. The values copied down to the finest-level grid form starting values for a conventional iterative solution of Laplace's equation over the finest-level grid.

If the method is used recursively, then effectively a pyramid of grids is created from finest level to coarsest level, then solved from the coarsest level back down to the finest level. The coarsest level is preferably chosen as that level beyond which it is in general no longer more advantageous to use the multigrid method than to use a conventional method to solve Laplace's equation. The coarsest level can either be predefined at a fixed density of, for example, two pixels in the smallest dimension, or can be predefined by an adaptive test which depends on the number of pixels which are fixed in any current level. For example, the coarsest level could be predefined as the first level in which all pixels are fixed.

A method for compressing an image file representing the back side of a check, or for compressing the extracted essential image data, is hereinafter described. The back-side of a check will comprise an image of overlapping bank endorsement stamps, and, possibly, a signature. A high degree of resolution is necessary to discern all endorsement stamps on the image of the back side after compression and decompression.

It should be understood that while the following method is utilized to compress the image file of the back side of the check, the scheme may be utilized with respect to the front side of the check.

Preferably, the image file is first decimated by, for example, a factor of two-to-four in each dimension, before image encoding is performed. The value of each pixel in the image array is determined by thinking of it as being at the cross-point center of a four-by-four pixel array.

For example, if a grid represents the image file array, with a rectangle in the grid representing a pixel, then a pixel in the decimated grid would cover a 16-pixel rectangle of the image file grid, centered at one of the crosspoints of the grid. JPEG compression may then be performed on the decimated image file before storage or transmission. Naturally, the file would be decompressed by JPEG compression before reconstruction of the original image file.

An inverse interpolation is performed to obtain a value for each pixel in the decimated grid. Starting with an image I with dimensions n1*n2, this image is to be decimated in each dimension by factors p1 and p2, producing a reduced image J with dimensions m1*m2, from which a restored image $I^{res}$ can be constructed by interpolation. The reduced image is chosen so that the restored image is as close as possible to the original image, in the least-squares sense, so as to allow for relatively easy reconstruction.

The interpolation is dependent on an interpolation kernel K(i1,i2) that is a function of displacements i1 and i2. K(i1,i2) is a predefined weighing matrix defining, for each restored grid pixel $I^{res}$ (i1,i2), the contribution that each pixel in the decimated file J should have in a weighted average to calculate the value to be assigned to the restored grid pixel $I^{res}$ (i1,i2). That is, after the decimated matrix J is found, the restored array will be given by $$I^{res}(i1,i2) = \sum_{a1,a2} K(i1 - p1*a1 + 1/2, i2 - p2*a2 + 1/2) * J(a1,a2).$$

(In the above, a1 and a2 are coordinates of the decimated array, whereas i1 and i2 are coordinates of the image array.)

K can be of any appropriate size in a given embodiment, but for a four by four decimation, K is preferably an eight-by-eight array. Thus on interpolation during reconstruction, each pixel value (and only those pixel values) in an eight-by-eight subarray of the decimated grid will contribute to each pixel of the reconstructed image array. The individual values of K should be chosen to decrease with increasing distance from the center of K; a Gaussian roll-off is possible, but a bi-linear roll-off is preferred due to its simplicity. Thus, K is preferably chosen as $$K(i1,i2) = \max\left(1 - \left|\frac{i1}{p2}\right|, 0\right) * \max\left(1 - \left|\frac{i2}{p2}\right|, 0\right).$$

Furthermore, if the kernel is scaled so that it sums up to 1, then the values J(a1,a2) will have (at least approximately) the range of the original image's values, thus the justification for treating it as an image. Note that in a different embodiment, K can be chosen differently for different pixels on the restored grid.

To assure complete coverage, n1 and n2 must be given by:

n1=(m1−1)*p1 n2=(m2−1)*p2

A real-life image may not have those convenient dimensions; it is simply extended by copying neighboring pixels to fill up the difference.

The solution matrix J can be found by any method for a given image, but a least-squares solution can be found by minimizing $$\sum_{i1,i2} [I^{res}(i1,i2) - I(i1,i2)]^2$$

leading to a system of linear equations:

$$\sum_{b1,b2}\left[\sum_{i1,i2} K(i1 - p1*a1 + 0.5, i2 - p2*a2 + 0.5) * K(i1 - p1*b1 + 0.5, i2 - p2*b2 + 0.5) * J(b1,b2) = \right.$$

$$\sum_{i1,i2} K(i1 - p1*a1 + 0.5, i2 - p2*a2 + 0.5) * I(i1,i2)$$

In these equations, the n1*n2 image I(i1,i2) is considered to be only one tile of an infinite image, where each tile has as neighbors other tiles that are equal to the original tile mirrored across their common border. In effect:

I(−i1,i2)=I(i1−1,i2)

I(i1,−i2)=I(i1,i2−1)

I(n1+i1,i2)=I(n1−i1−1,i2)

I(i1,n2+i2)=I(i1,n2−i2−1)

and so on, for each i from 0 to the corresponding n−1.

This makes the job much easier, and the problem reduces to the following.

Find the interpolation kernel * original image:

$$J_0(a1,a2) = \sum_{i1,i2} K(i1 - p1*a1 + 0.5, i2 - p2*a2 + 0.5) * I(i1,i2)$$

which is to be multiplied by 2 for a single border and by 4 for a corner (two borders at once). The kernel auto correlation function is:

$$C(a1 - b1, a2 - b2) = \sum_{i1,i2} K(i1 - p1*a1 + 0.5, i2 - p2*a2 + 0.5) *$$

$$K(i1 - p1*b1 + 0.5, i2 - p2*b2 + 0.5)$$

which can be easily precalculated, and the resulting equations for J(b1,b2) are:

$$\sum_{b1,b2} C(a1-b1,a2-b2) * J(b1,b2) = J_0(a1,a2)$$

Due to the reflections, we have these symmetries, analogous to the ones for the I's:

$J(-i1,i2)=J(i1-1,i2)$ $J(i1,-i2)=J(i1,i2-1)$ $J(m1+i1,i2)=J(m1-i1-1,i2)$ $J(i1,m2+i2)=J(i1,m2-i2-1)$ and so on, for each i from 0 to the corresponding m−1.

This symmetry suggests that a solution can be found using some appropriate relative of the Fourier Transform, preferably the Discrete Cosine Transform, using the version that is used in JPEG, but over a much bigger index range (at least, most of the time).

The coefficients are given by:

$$R(n:a,i) = \begin{cases} \frac{1}{\sqrt{n}} & \text{if } a=0, \\ \sqrt{\frac{2}{n}} * \cos\left(\frac{a*(2i+1)\pi}{2n}\right) & \text{if } a \neq 0 \end{cases}$$

The value n is the size of the block, which for JPEG, is n=8. The transformed values are:

$$\tilde{J}(a1,a2) = \sum_{i1,i2} R(m1:a1,i1) * R(m2:a2,j2) * J(i1,i2)$$

and the inverse-transformed values are:

$$J(i1,i2) = \sum_{a1,a2} R(m1:a1,i1) * R(m2:a2,j2) * \tilde{J}(a1,a2)$$

When this transform is done on the equation for J(b1,b2), we get:

$$\tilde{C}(a1,a2) * \tilde{J}(a1,a2) = \tilde{J}_0(a1,a2)$$

which can easily be solved by division. The transformed kernel auto correlation function is given by:

$$\tilde{C}(a1,a2) = \sum_{i1,i2} \cos\left[\frac{a1*(2i1+1)\pi}{2*m1}\right] * \cos\left[\frac{a2*(2i2+1)\pi}{2*m2}\right] * C(i1,i2)$$

The solution matrix J calculated as above is a decimated version of the difference file. This solution matrix is essentially another image file, and is encoded by any conventional technique for encoding images, such as those incorporated above. Several of such techniques involve a quantization step as an important factor in the significant compression achieved. The quantization step destroys information, which is why such techniques are referred to as being "lossy". The coarser the quantization, the greater the information destruction, but the greater the compression. When compressing the decimated difference file in an embodiment of the present invention, it is desirable to choose a finer quantization in these techniques to minimize loss even at the expense of compression.

For example, if the JPEG technique is used for compressing the decimated difference file, then a quantization table should be adopted which is finer than one would expect if the quantization table of the Independent JPEG Group's standard is merely modified for the higher quality factor normally considered appropriate for a decimated image file. Such a quantization table could either be predefined and constant for all images, or optimized for each image separately and transmitted as overhead information to the receiver with each image. The quantization tables are also preferably chosen to be symmetrical about a diagonal from upper left to lower right, and increasing (or at least never decreasing) from left to right and from top to bottom. The preferred quantization tables for JPEG-encoding of these decimated image files are as follows:

| Luminance Table | | | | | | | |
|---|---|---|---|---|---|---|---|
| 16 | 16 | 16 | 16 | 24 | 40 | 51 | 72 |
| 16 | 16 | 16 | 19 | 26 | 58 | 64 | 92 |
| 16 | 16 | 16 | 24 | 40 | 57 | 78 | 95 |
| 16 | 19 | 24 | 29 | 56 | 87 | 87 | 98 |
| 24 | 26 | 40 | 56 | 68 | 109 | 109 | 112 |
| 40 | 58 | 57 | 87 | 109 | 109 | 121 | 121 |
| 51 | 64 | 78 | 87 | 109 | 121 | 121 | 121 |
| 72 | 92 | 95 | 98 | 112 | 121 | 121 | 121 |
| Chrominance Table | | | | | | | |
| 17 | 18 | 24 | 47 | 99 | 99 | 99 | 128 |
| 18 | 21 | 26 | 66 | 99 | 99 | 99 | 128 |
| 24 | 26 | 56 | 99 | 99 | 99 | 128 | 128 |
| 47 | 66 | 99 | 99 | 99 | 128 | 128 | 128 |
| 99 | 99 | 99 | 99 | 128 | 128 | 128 | 128 |
| 99 | 99 | 99 | 128 | 128 | 128 | 128 | 128 |
| 99 | 99 | 128 | 128 | 128 | 128 | 128 | 128 |
| 128 | 128 | 128 | 128 | 128 | 128 | 128 | 128 |

The computational effort required is derived by noting that the original image contains n1*n2 pixels, while the reduced image contains m1*m2 pixels. Assuming that the interpolation kernel only overlaps its neighbors, and each pixel therefor only has contributions for 4 reduced values via their kernels, the encoding complexity reduces to finding the J0's from the I's: 4*n1*n2; Fourier Transforms: m1*m1* (m1+m2), or if fast Fourier transforms are used: m1*m2(log (m1)+log(m2)); and Fourier domain solution: m1*m2. The decoding complexity is: interpolation 4*n1*n2.

Thus, decoding is relatively easy since it is a linear operation. Input dimensions K1*K2 will produce output dimensions [p1*(k1−1)]*[p2*(k2−1)]. For example, an 8*8 block of outputs with a reduction of 4 in both dimensions will need a 3*3 block of inputs. Encoding is somewhat more complex, since one must first produce the J0's and then the J's. For producing J0 in a block of [k1*11]*[k2*12] inputs will produce a block of [k1−1]*[k2−1] outputs; with reduction by 4 in both dimensions, a block of 8*8 inputs will produce a single output. For a 640*480 image reduced by a factor of 4 in both dimensions, one has to do Fourier transforms of order 160 and 120. A Fourier transform in the digital domain might perhaps be more feasible, since it will only need to be done on a data set 1/16 the size of the original.

Figure 9:
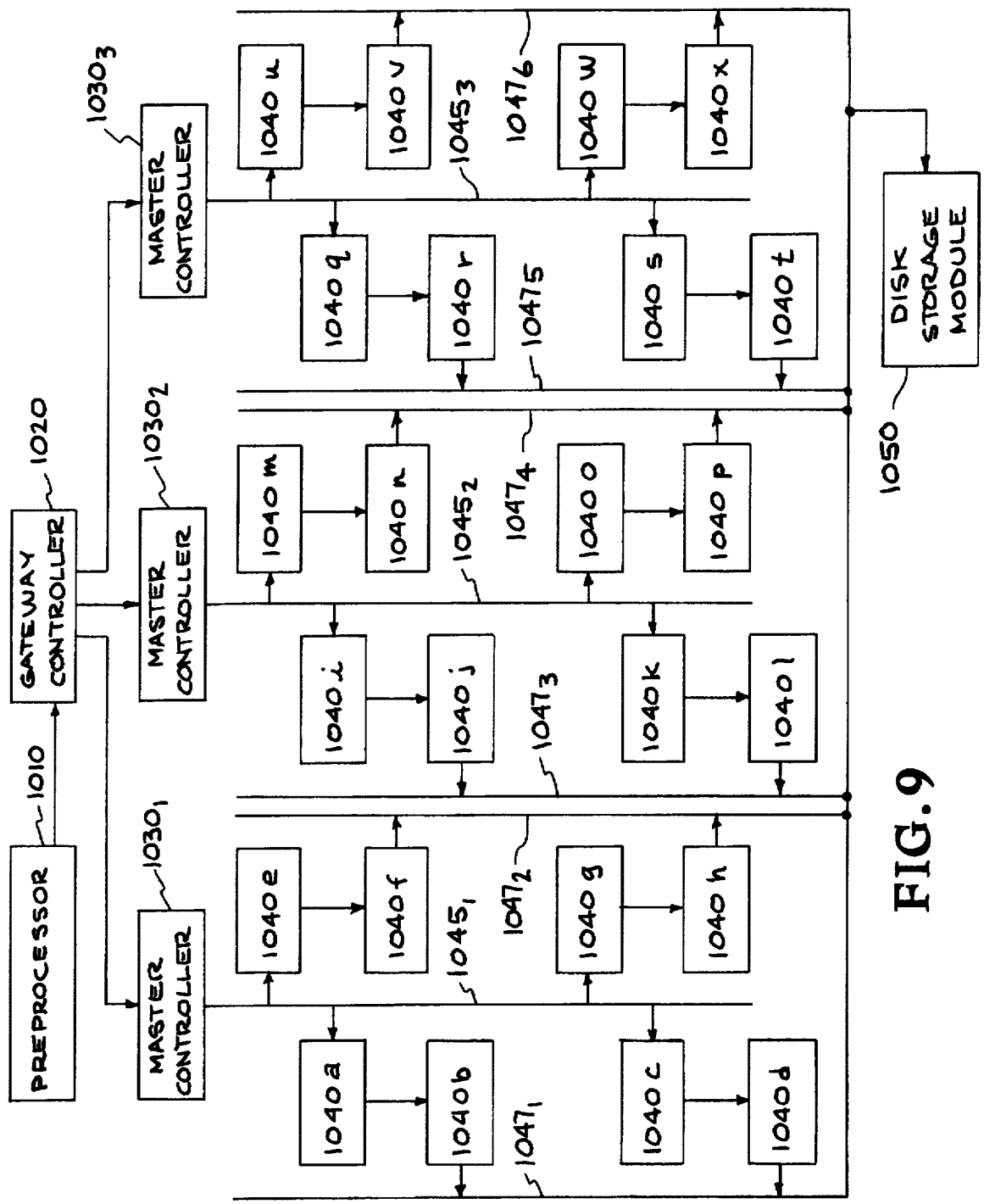
FIG. 9 sets forth a parallel hardware model for implementing the process of the present invention.

A parallel and pipelined hardware model for implementing the method steps described with respect to FIGS. 3A, 3B, and 4 is set forth in FIG. 9. Numerous different hardware models are suitable for implementing the compression schemes of the present invention, and the model set forth in FIG. 9 is not intended to be limiting with respect to the type of hardware solution which may be utilized. Uncompressed check image files are first subjected to a preprocessor 1010 which can comprise a single microprocessor or multiple-microprocessor array, such as the CNAPS Server II system or multiple such systems by Adaptive Solutions, which is suitable for handling approximately 80 megabytes of data per second, which is required assuming that approximately 140,000 checks per hour will need to be processed by the system. The preprocessor 1010 need only be required to perform low resolution, high-speed processing on 9 pixels at a time. Thus, an 8-bit or greater processor, operating at a rate to perform 5.12 billion multiplications and accumulation operations per second, is suitable for use herewith. The preprocessor 1010 performs step 332 in FIGS. 3A and 3B, as discussed above, and optimally can perform the image enhancement operation described with respect to step 322 on approximately 9 pixels simultaneously.

The processed information is then fed to a gateway controller 1020 which is a distribution processor to split the data stream of pre-processed image data to a series of master controllers $1030_{1-3}$. (While three such master controllers are shown in FIG. 9, it will be readily understood that additional processors may be used, along with additional busses 1045 and image processors, depending on the application.) Each master controller 1030 is essentially a housekeeping processor for a series of image processors $1040_{a-x}$ on busses $1045_{1-3}$. The data rate on busses $1045_{1-3}$ is approximately 20 megabytes per second. Thus, the master controller processors $1030_{1-3}$ also serve a housekeeping function to distribute the processed image data to image processors. Image processor 1040 may be of a PC-Hydra Quad TMS320C40, which includes 2 or 4 TMS320C40 Digital Signal Processors manufactured by Texas Instruments. Each image processor 1040 can perform 200 MFLOPS and 1.1 BOPS, which is sufficient to perform steps 324, 302, 326, 328, 308, 330, 332, 334, 338 and 340 20 MBPS data rate. The image processor 1040 then feeds the image data to a disk storage module 1050, such as a RAID-Level 5 compatible system.

A second, parallel processor (not shown) of a type similar to processor 1020 and in parallel therewith, may be provided to perform the decimation and compression routine set forth above for the back side of the checks.

The present invention thus provides excellent reproduction of signatures and other hand-written images after compression and decompression. While writing from a red ballpoint pen is lost in certain compression technology, in experiments conducted using the technique of the present invention, red ballpoint pen images were successfully maintained. Using the decimation and interpolation algorithm described above, overlapping stamps of different colors are clearly resolved, even at very high compression ratios. Moreover, the decompression hardware may be implemented using a PC platform using a –386 and –486 class of microprocessor, making decompression of images possible in the home or at a branch office of the financial institution at a relatively low cost. Substantial financial savings can be achieved through the compression techniques of the present invention in terms of both storage costs and transmission costs.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method of storing documentary information, the documentary information comprising background information and user-recorded information in a digitized image array comprising a plurality of pixels each having a color value, comprising:

extracting the user information from the background information;

converting the user information to a two-color format;

compressing the user information;

wherein the extracting includes enhancing the contrast of the pixels by performing a gamma correction on the array;

enhancing the color value of each of said pixels;

identifying pixels of said image array being edge pixels lying on edges of said image;

converting pixels at an edge to a black color value and an adjacent pixel to a white color value, respectively;

determining a distance between each black pixel in the array from other black pixels in the array, and converting each of two pixels that exceed a given separation distance between themselves to a white color value;

creating a filled edge array of pixels each corresponding to a respective pixel in said image array.

2. The method of claim 1 wherein said step of converting comprises the sub-steps of:

creating a first two color image of the scanned image by converting all pixels over a threshold color value to black and all pixels below the threshold color value to white;

creating a second two color image of the filled edge file by converting all pixels over a second threshold value to black and all pixels below the second threshold color value to white;

combining the first two color image and the second two color image; and filtering the combined image to smooth the edges of the image.

3. The method of claim 2 wherein said step of compressing comprises:

compressing said combined image using a compression algorithm with an optimized Huffman table generated for each image compressed and that is based on the composition of said image, wherein a customized Huffman table for each document in a set of images may then be transmitted or stored with said image and used for decompression, and provides for a decompression of data that is relatively computationally non-intensive.

4. A method for processing an image represented by an image array of pixels, each pixel having a color value and a position, comprising the steps of:

enhancing contrast of the pixels by performing a gamma correction on each pixel in the array;

enhancing the color value of each of said pixels by iteratively solving for a new color value based on the position of the pixel in the array;

identifying pixels of said image array being edge pixels lying on edges of said image;

converting sets of adjacent edge pixels to a black color value and a white color value, respectively;

determining a distance between each black pixel in the array and neighboring pixels of any color in the array, and, if there are no nearby pixels within a window of directions, converting said black pixels to white ones;

creating a filled edge array of pixels each corresponding to a respective pixel in said image array;

creating a two-color image of the filled edge array by converting all pixels darker than a first threshold color value to black and all pixels lighter than the threshold color value to white;

creating a two-color image of the scanned image array by converting all pixels darker than a second threshold color value to black and all pixels lighter than the second threshold color value to white;

comparing the two-color image of the scanned image array with the two-color image of the filled edge array to create a combined image;

filtering the combined image to smooth the edges of the image; and compressing the filtered, combined image.

5. A method, comprising the steps of:

providing an image array of pixels to be compressed;

performing a gamma correction on the color value for each pixel in the array;

enhancing a color value for each pixel in the array;

identifying pixels of said image array being edge pixels lying on edges of said image;

performing a two-color reduction on the edge pixels;

performing a line length correction on all black pixels in the array;

creating a filled edge array of pixels each corresponding to a respective pixel in the image array representing said subject image;

creating a two-color image of the filled edge array by converting all pixels darker than a first threshold color value to black and all pixels lighter than the threshold color value to white;

creating a two-color image of the scanned image array by converting all pixels darker than a second threshold color value to black and all pixels lighter than the threshold color value to white;

comparing the two-color image of the scanned image array with the two-color image of the filled edge array to create a combined image;

filtering the combined image to smooth the edges of the image; and compressing the filtered, combined image to form a compressed image file.

6. The method of claim 5 further including the steps of:

transmitting the compressed image file from a first system to a second system; and de-compressing the compressed image file.

7. The method of claim 5 further including the steps of:

storing the compressed image file from a first system to a second system; and de-compressing the compressed image file.

8. The method of claim 6 further including the step of:

filtering the de-compressed image file to smooth the edge pixels.

9. A method of storing documentary information, the documentary information comprising background information and user-recorded information in a digitized image array comprising a plurality of pixels each having a color value, comprising:

extracting the user information from the background information;

converting the user information to a two-color format;

compressing the user information;

wherein the extracting includes enhancing contrast of the pixels by performing a gamma correction or some similar intensity remapping on each pixel in the array;

enhancing the color value of each of said pixels by iteratively solving for a new color value based on the position of the pixel in the array;

identifying pixels of said image array being edge pixels lying on edges of said image;

converting each edge pixel to a black color value and an adjacent pixel to a white color value;

determining a distance between each black pixel in the array and neighboring pixels of any color in a number of directions in the array, and, if there are no nearby pixels within a set of directions, converting said black pixels to white ones; and creating a filled edge array of pixels each corresponding to a respective pixel in said image array.

10. The method of claim 9 wherein the step of converting the information to a two color format comprises:

creating a two-color image of the filled edge array by converting all pixels darker than a first threshold color value to black and all pixels lighter than the threshold color value to white;

creating a two-color image of the scanned image array by converting all pixels darker than a second threshold color value to black and all pixels lighter than the second threshold color value to white; and comparing the two-color image of the scanned image array with the two-color image of the filled edge array to create a combined image.

11. The method of claim 9 wherein the step of compressing the user information comprises:

compressing said combined image using a compression algorithm with an optimized Huffman table generated for each image compressed and that is based on the composition of said image, wherein a customized coding table for each document in a set of images may then be transmitted or stored with said image and used for decompression, and that provides for a decompression of data that is relatively computationally non-intensive.

12. The method of claim 11 wherein the step of compressing the user information comprises:

defining a Huffman coding table for each combined image.

13. An apparatus for compressing an image file, comprising:

means for decimating the image file to create a decimated image file (I), the image file comprisig a plurality of image pixels having a dimension n1*n2, the means decimating the image file in each dimension by factors of p1 and p2, the decimated image file having dimensions m1*m2; and means for interpolating the decimated image file to produce a reconstructed image file ($I_{res}$), the means for interpolating using a bilinear interpolation kernel;

wherein the bilinear interpolation kernel is defined as:

$$K(i1,i2) = \max\left(1 - \left|\frac{i1}{p2}\right|, 0\right) * \max\left(1 - \left|\frac{i2}{p2}\right|, 0\right).$$

14. The apparatus of claim 13 wherein n1 and n2 are defined as:

n1=(m1−1)*p1
n2=(m2−1)*p2.

15. The apparatus of claim 14 wherein the restored image is given in terms of the reduced image by:

$$I^{res}(i1,i2) = \sum_{a1,a2} K(i1 - p1*a1 + 1/2, i2 - p2*a2 + 1/2) * J(a1,a2).$$

16. A method of storing documentary information, the documentary information comprising background information and user-recorded information in a digitized image array comprising a plurality of pixels each having a color value, comprising:
 extracting the user information from the background information;
 converting the user information to a two-color format to create an image file;
 compressing the user information by decimating the image array to create a decimated image file, the image array having a dimension n1*n2 and being decimated in each dimension by factors of p1 and p2, the decimated image file having dimensions m1*m2; and
 interpolating the decimated image file to produce a reconstructed image file, the means for interpolating using a bilinear interpolation kernel.

17. The method of claim 16, wherein prior to said interpolating step, the method includes the steps of
 compressing the decimated image file using JPEG compression; and
 decompressing the decimated image file using JPEG compression.

18. An apparatus for storing documentary information contained in an image file, the image file comprising a digitized image array containing user information and background information, comprising:
 compression means for compressing the image file, including
  means for extracting the user information from the background information by
   enhancing contrast of the pixels by performing a gamma correction on each pixel in the array,
   enhancing the color value of each of said pixels by iteratively solving for a new color value based on the position of the pixel in the array,
   identifying pixels of said image array being edge pixels lying on edges of said image;
   converting each edge pixels to a black color value and an adjacent pixel to a white color value;
   determining a distance between each black pixel in the array and neighboring pixels in the array;
   creating a filled edge array of pixels each corresponding to a respective pixel in said image array;
   creating a two-color image of the filled edge array by converting all pixels darker than a first threshold color value to black and all pixels lighter than the threshold color value to white;
   creating a two-color image of the scanned image array by converting all pixels darker than a second threshold color value to black and all pixels lighter than the second threshold color value to white; and
   comparing the two-color image of the scanned image array with the two-color image of the filled edge array to create a combined image; and
 means for compressing the user information and decompressing the user information, comprising
  means for decimating the image file to create a decimated image file (J), the image file comprising a plurality of image pixels having a dimension n1*n2, the means decimating the image file in each dimension by factors of p1 and p2, the decimated image file, the decimated image file having dimensions m1*m2; and
  means for interpolating the decimated image file to produce a reconstructed image file ($I_{res}$), the means for interpolating using a bilinear interpolation kernel.

19. An apparatus for processing an image-pixel array, comprising:
 a first processor, the first processor
  enhancing contrast of the pixels by performing a gamma correction on each pixel in the array; and
  enhancing the color value of each of said pixels by iteratively solving for a new color value based on the position of the pixel in the array;
 a data bus coupled to the first processor;
 a second processor, coupled to the data bus and the first processor, the second processor
  identifying pixels of said image array being edge pixels lying on edges of said image;
  converting each edge pixels to a black color value and an adjacent pixel to a white color value;
  determining a distance between each black pixel in the array and neighboring pixels in the array;
  creating a filled-edge array of pixels each corresponding to a respective pixel in said image array;
  creating a two-color image of the filled-edge array by converting all pixels darker than a first threshold color value to black and all pixels lighter than the threshold color value to white;
  creating a two-color image of the scanned image array by converting all pixels darker than a second threshold color value to black and all pixels lighter than the second threshold color value to white; and
  comparing the two-color image of the scanned image array with the two-color image of the filled-edge array to create a combined image file.

20. An method for compressing an image file, comprising:
 decimating the image file to create a decimated image file (J), the image file comprising a plurality of image pixels having a dimension n1*n2 such that the image file is decimated in each dimension by factors of p1 and p2, the decimated image file having dimensions m1*m2; and
 interpolating the decimated image file to produce a reconstructed image file ($I_{res}$) using a bilinear interpolation kernel defined as:

$$K(i1,i2) = \max\left(1 - \left|\frac{i1}{p2}\right|, 0\right) * \max\left(1 - \left|\frac{i2}{p2}\right|, 0\right).$$

21. The method of claim 20 wherein n1 and n2 are defined as:
n1=(m1−1)*p1
n2=(m2−1)*p2.

22. The method of claim 21 wherein the restored image is given in terms of the reduced image by:

$$I^{res}(i1,i2) = \sum_{a1,a2} K(i1 - p1*a1 + 1/2, i2 - p2*a2 + 1/2) * J(a1,a2).$$

* * * * *